United States Patent [19]

Rockefeller

[11] 4,061,253
[45] Dec. 6, 1977

[54] METERING DISPENSING BOTTLE

[75] Inventor: Winston C. Rockefeller, Woodcliff Lake, N.J.

[73] Assignee: Colgate-Palmolive Company, New York, N.Y.

[21] Appl. No.: 615,865

[22] Filed: Sept. 22, 1975

[51] Int. Cl.$^2$ ............................................. G01F 11/26
[52] U.S. Cl. ..................................... 222/442; 222/455
[58] Field of Search ................................ 222/454–457, 222/464, 442

[56] References Cited

U.S. PATENT DOCUMENTS

| 231,811 | 8/1880 | Ketcham | 222/455 |
| 1,687,705 | 10/1928 | Androff | 222/455 X |
| 2,387,374 | 10/1945 | Watters | 222/455 |
| 2,977,028 | 3/1961 | Joffe | 222/454 X |
| 3,163,335 | 12/1964 | Chappell | 222/455 |

FOREIGN PATENT DOCUMENTS

| 1,064,934 | 12/1953 | France | 222/454 |
| 5,662 of | 1904 | United Kingdom | 222/455 |

Primary Examiner—Stanley H. Tollberg
Assistant Examiner—Charles A. Marmor
Attorney, Agent, or Firm—Kenneth A. Koch; Herbert S. Sylvester; Murray M. Grill

[57] ABSTRACT

A container for dispensing predetermined quantities of liquid comprises a first or primary container having a bottom portion, sidewall portion and open-ended neck portion. A second container comprising an elongated tubular substantially within the first container depending from the neck portion thereof. A third container disposed completely within the first container is integral with and disposed substantially concentrically around the second container. The third container comprises sidewall, bottom and top portions which together form a fluid sealing enclosure, the top and bottom portions being integral with and supported by the outer surface of the second container. The third container, communicates with the primary container by means of an opening provided in the upper portion to its sidewall portion serving as a liquid inlet. A second tubular member of relatively small diameter connects the bottom portion of the second container with the portion of the third container. In normal use, tipping of the container to pouring position results in the discharge of liquid present in the second container. Simultaneously therewith, liquid from the primary container enters the third container through the liquid inlet opening. Restoration of the container to its normal upright position causes liquid in the third container to enter the second container through the tubular member connecting the bottom portions of these containers.

10 Claims, 7 Drawing Figures

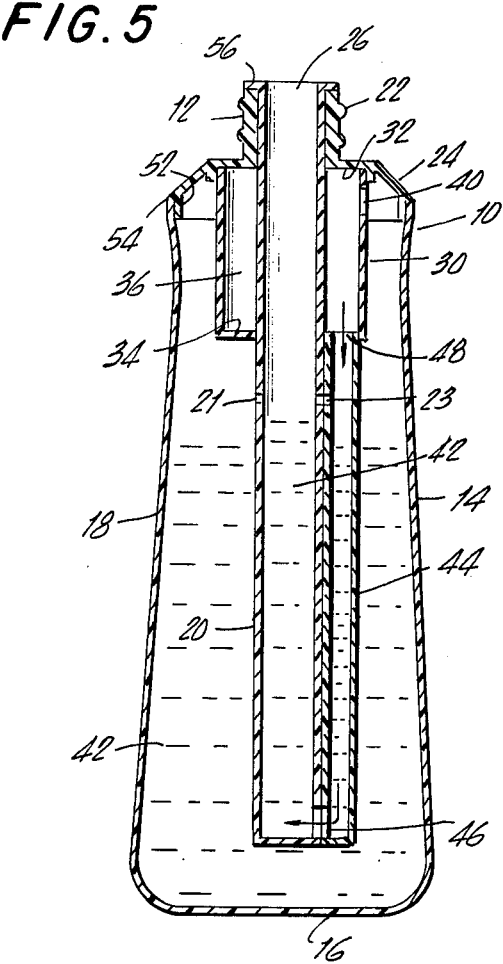
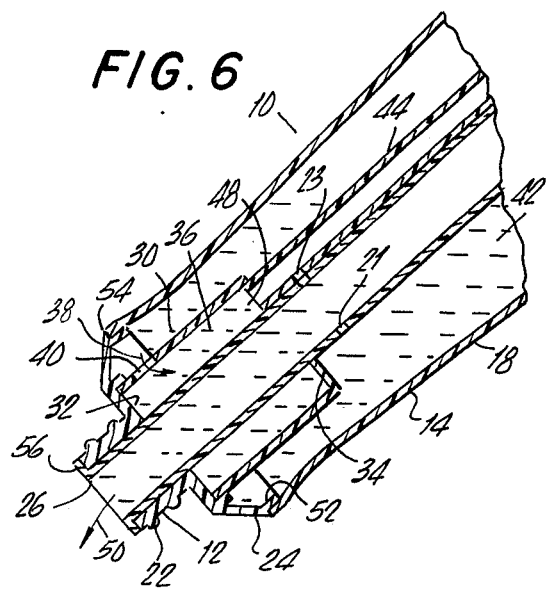
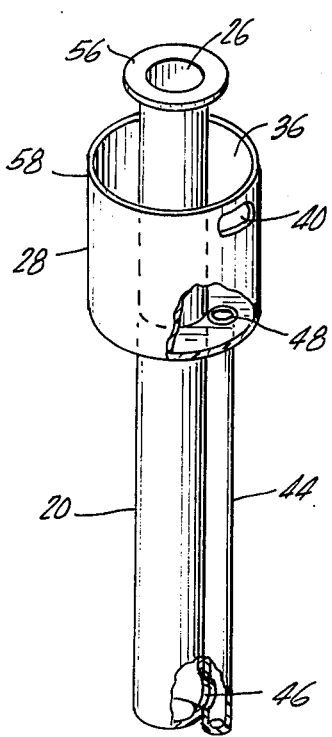

METERING DISPENSING BOTTLE

BACKGROUND OF THE INVENTION

1. Field of the Invention

The invention relates generally to containers for the storage and dispensing of fluids and particularly to containers enabling the repetitive dispensing of predetermined quantities of liquid.

2. Description of the Prior Art

Containers adapted to enable the dispensing of measured quantities of liquid are known in the art and are provided in a wide variety of designs and constructions. According to one well known embodiment, the cap member comprising closure means for the container is of a predetermined size and serves as fluid metering or measuring means. Thus, in use, the cap is removed and the container liquid is poured thereinto in the amount desired. As will be appreciated, such a method is awkward and likely to lead to spillage of the liquid which can be costly. Moreover, spillage involves the risk of damage to the wearing apparel of the user not to mention the possible risk of personal safety.

Containers enabling the disposing of predetermined quantities of liquid are of significant value with respect to a wide variety of liquids ranging from laundry aids such as detergents, softeners, bleaches and the like to medicinal and pharmaceutical preparations. The possible applications are practically limitless. However, due to inefficient construction, the containers thus far provided are not readily adaptable for effective commercial use.

OBJECTS OF THE INVENTION

A primary object of the present invention is to provide a container adapted for the simple and effective dispensing of predetermined quantities of liquid wherein the foregoing and related disadvantages are eliminated or at least mitigated to a substantial extent.

Another object of the invention is to provide such a container wherein any requirement for the use of a cap or other container closure member or any external device whatsoever for effecting fluid measurement is completely obviated.

Yet another object of the invention is to provide such a container wherein problems stemming from liquid spillage are virtually eliminated.

Still another object of the invention is to provide such a container wherein any necessity for the exercise of judgement on the part of the user regarding the amount of liquid to be retrieved from the container in a single charge is eliminated.

A further object of the invention is to provide such a container enabling repetitive dispensing of predetermined quantities of liquid.

A still further object of the invention is to provide such a container wherein the act of pouring simultaneously determines a measured amount of liquid to be retrieved during the next succeeding pouring operation.

Yet a further object of the invention is to provide such a container of relatively simple construction having a minimum of parts and economical to manufacture.

These and other objects of the invention will become more apparent hereinafter as the description proceeds.

The foregoing objects are attained in accordance with the invention which in its broader aspects provides a container for dispensing predetermined quantities of liquid comprising a first or primary container having a bottom portion, sidewall portion and open ended neck portion, a second container disposed at least substantially within the first container and depending from the neck portion thereof comprising an elongated tubular member open ended at its upper extremity, a third container disposed completely within said first container integral with and disposed substantially concentrically around said second container, said third container comprising sidewall, bottom and top portions which together form a fluid sealing enclosure, the top and bottom portions being integral with and supported by the outer surface of said second container, said third container communicating with said first container by means of an opening provided in the upper portion of said sidewall portion said opening serving as a liquid inlet to said third containers and serving as a fluid passageway therebetween.

The invention will be described in detail by reference to the accompanying drawings wherein:

BRIEF DESCRIPTION OF THE DRAWINGS

FIG. 5 is a vertical sectional view illustrating the container in liquid-primed condition;

FIG. 6 is a partial sectional view illustrating the pouring and priming operations.

FIG. 7 is a perspective view shown partly broken away of an insert member in accordance with the invention.

DETAILED DESCRIPTION OF THE INVENTION

Figure 1:
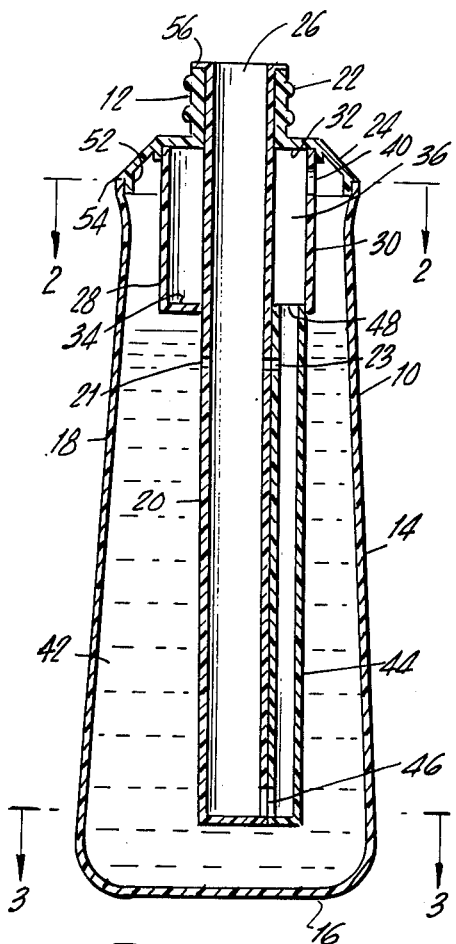
FIG. 1 is a vertical sectional view illustrating the container and liquid contents in pre-primed condition.

With continuing reference to the accompanying drawing wherein like reference numerals designate similar parts throughout the various views, reference numeral 10 generally designates a container in accordance with the invention. Container device 10 comprises a first, outer container 18 having bottom portion 16 and sidewall portion 14 terminating in open-ended neck portion 12 which may be provided with external threads 22 for threadedly receiving suitable closure means (not shown). Outer container 18 may be tapered as illustrated at 24.

Figure 4:
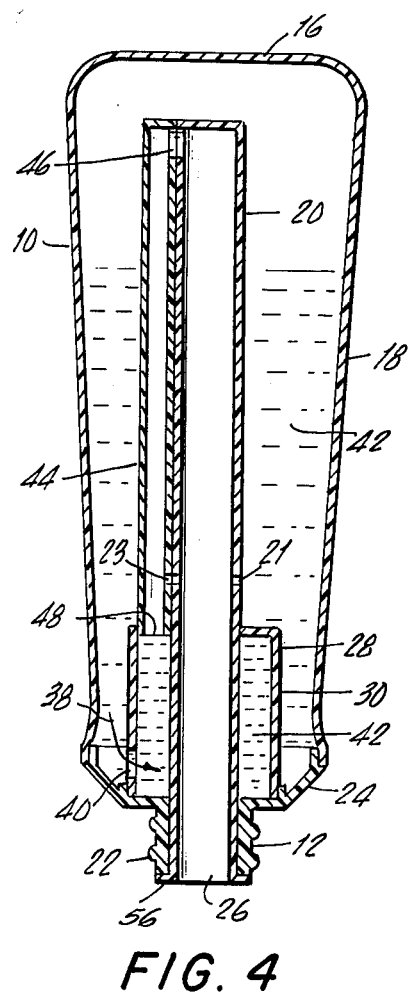
FIG. 4 is a vertical sectional view of the container in inverted position illustrating the liquid priming operation.
Figure 2:
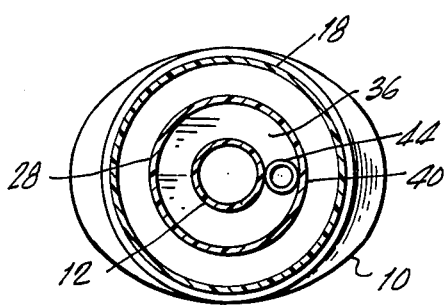
FIG. 2 is a sectional view taken along the line 2—2 in FIG. 1.
Figure 3:
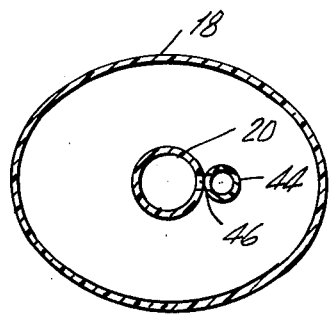
FIG. 3 is a sectional view taken along the line 3—3 in FIG. 1.

A second container 20 comprises an elongated essentially tubular member disposed at least partially within neck portion 12 and depending downwardly therefrom. The second container is open ended at its upper extremity whereby to form pour spout 26 and is provided with a pair of opposed air vent holes 21 and 23 the functions of which will be explained more fully hereinafter. Second container 20 extends downwardly to an extent approximating at least about 50% and preferably at least about 70% of the internal height of outer container 18. The dimensions of container 20 can be varied so as to determine the volume of liquid confined therein, this being directly related to the dimensions of third container 28 as will be explained more fully hereinafter. Container 28 comprises sidewall portion 30 top portion 32 and bottom portion 34 which together define a fluid sealing enclosure, the annular space 36 between the outer surface of container 20 and the inner surface of container 28 providing fluid reservoir means. Thus, container 28 is disposed substantially concentrically around container 20, the top portion 32 and bottom portion 34 of container 28 being integral with and thus supported by container 20. The concentric disposition of containers 20 and 28 is best illustrated in FIG. 2. Container 28 communicates with primary container 18 by means of opening 40 located in the upper portion of sidewall 30 the opening serving as liquid inlet means for passage of liquid 42 from primary container 18 into container 28, when the latter is tipped to pouring position as illustrated in FIG. 4.

The bottom portions of containers 20 and 28 are connected by tubular member 44 which serves as a conduit for passage of fluid from container 28 to container 20 through openings 46 and 48.

The container 10 is provided in either primed or pre-primed condition, the latter being illustrated in FIG. 1. By "primed" is means that the amount of liquid constituting the amount to be retrieved from the container in a single pouring operation, this amount corresponding to the amount of liquid accommodated by container 28, is present in container 20. In FIG. 1 the total amount of liquid initially charged to container 10 is confined solely within first container 18. Priming is accomplished as follows. Container 10 is displaced from its normal upright position to the position illustrated in FIG. 4. It will be understood that the container may be tipped to a position slightly inclined from the horizontal as illustrated in FIG. 6 the requirements here being that the container 10 be tipped to an extent sufficient to cause liquid 42 to pass from container 18 to container 28 through opening 40 as indicated by directional arrow 38, when container 28 is filled with liquid 42 as illustrated in FIG. 5. As a result, the liquid present in container 28 passes or drains into container 20 by means of tubular member 44 and openings 46 and 48. Drainage from container 28 continues until the liquid levels in container 20 and tubular member or conduit 44 are approximately equal. As will be readily apparent, the liquid contents of container 28 supply the "head" necessary for inter-container fluid flow. The amount of liquid exchange tubular member 44 will be small relative to the total volume of liquid initially charged to container 10, this amount usually approximately about 2%.

The volume of liquid now present in container 20 which approximates the volume of container 28 is retrievable by the user for useful purposes through pour spout 26. Preferably, the volume of container 28 should be at least equal to or greater than the volume of container 20. Discharge of liquid from container 20 is effected by tipping container 10 to a position inclined from the horizontal as previously explained and as illustrated in FIG. 6. The liquid in container 20 is discharged as indicated by directional arrow 50. Simultaneous therewith, the liquid in primary container 18 flows through opening 40 into container 28. Container 10 is maintained in the inclined position until container 28 is filled. Restoration of container 10 to its normal, upright standing position causes the liquid in container 28 to flow into container 20 in the manner previously described.

Thus, the present container device enables the repeated dispensing of a predetermined quantity corresponding substantially to the volume of container 28, until substantially complete evacuation of the entire initial liquid content of primary container 18 is obtained. One of the particularly valuable advantages of the invention resides in the fact that by the single act of pouring not only is the predetermined quantity present in container 20 made available to the user but in addition the next succeeding liquid quantity is "measured" by means of container 28, this quantity being transported to retrievable position by merely returning container 10 to normal upright position.

In the aforedescribed operations, air vent holes 21 and 23 allow air to be vented into primary container 18 to thereby allow liquid to drain through hole 40. The latter enables an overflow from container 20 to achieve an exact full volume in container 20 as well as providing pressure differential in order to get air displacement necessary to the described flow of liquid.

Container device 10 can be manufactured according to well known procedures. The device is preferably provided as a unitary structure for purposes of improved structural stability. Thus, a first unit comprising the second container 20, third container 28 neck portion 12 tapered portion 24 and tubular member 44 can be prepared by suitable injection molding techniques as is known in the art. The remaining portion of primary container 18 can be similarly prepared. The respective units can be permanently joined by known welding procedures to provide the product container device. For these purposes, tapered portion 24 can be provided with rib portion 52 to provide seat means which serves as a locus of joinder fore the welding operation as illustrated at 54.

In any event, it will be understood that the term "primary container" or "first container" as used herein refers to that portion of the container device 10 which includes the free space situated between the outer surface of containers 20 and 28 and tubular member 44 on the one hand and primary container 18 on the other hand.

The container device 10 can also be prepared by providing containers 20 and 28 and tubular member 44 as a separate unit such as illustrated in FIG. 7 and generally designated 58. The primary container 18 is provided as separate, mating longitudinal sections. The unitary member 58 and longitudinal sections are fitted together and joined as by welding along the longitudinal seam. In this embodiment, rim or lip portion 58 is supported by the lateral edge of neck portion 12 which can be welded together in known manner. In this embodiment the top surface 32 of container 28 is a part of container 28 as contrasted with the embodiment illustrated in FIG. 1 in which surface 32 also defines a portion of the primary container 18.

In the foregoing embodiments, the container device 10 is of permanent construction. However, it will be understood that the container can be prepared in such manner as to enable access to primary container 18 for purposes of recharging same with a suitable liquid. Thus, primary container 18 may be provided with suitable valve means (not shown) in the area adjacent bottom surface 34 of container 28 to enable charging of liquid to container 18.

It will be understood that the particular manner in which container device 10 is manufactured forms no part of the present invention. As the foregoing discussion makes clear, a number of approaches are feasible.

The dimensions of the containers 20 and 28 may vary having reference to the rate of fluid flow from container 18 into container 28 as well as from container 20 through pour spout 26. Preferably, and as previously mentioned, the volume of container 28 should be at least equal to or greater than the volume of container 20.

Preferably, total discharge of liquid from container 20 should be approximately coincident with the filling of container 28. The size of opening 40 in container 28 can be varied to expedite this result. The volume of liquid accommodated by container 28 and thus to be discharged from container 20 in a single pouring operation determines in part the dimensions of container 20. Thus, the dimensions of container 20 should be such as to accommodate the effective liquid volume of container 28 within that portion of container 20 situated below bottom surface 34 of container 28. In general, the ratio of the volume of container 28 to that volume of container 20 below surface 34 is no more than about 0.9:1. The size of tubular member 44 is relatively small so as to minimize the volume of liquid confined therein as previously explained in general, having reference to containers of generally cylindrical shape, the diameter of tubular member 44 will be at least about 10% and preferably from about 10–25% of the diameter of container 20. The viscosity and surface tension of liquid 42 is a factor in determining the diameter of tubular member 44. Within the limits given, the inside diameter should be large enough to avoid liquid "stall" i.e., stoppage of fluid flow yet small enough to prevent liquid 42 from flowing "upwards" when tube 44 is inverted. The diameter and height of container 28 is controlled by the amount of liquid desired to be poured in a single operation. In general the diameter of container 28 will exceed the diameter of container 20 by at least about 50% in order to minimize the depth of container 28. The depth of container 28 will approximate at least about 15% of the depth of container 20 and preferably from about 15–50%. In any event, it will be appreciated that the dimensions of the internal containers may vary widely and can be easily determined in a particular instance by the formulator.

Container device 10 can be prepared from glass or a wide variety of well known film forming polymeric synthetic resinous plastic materials such as polyethylene polyvinyl chloride to the liquid material to be charged to primary container 18. In general, plastics are preferred materials of construction being more easily adaptable to molding operations.

A latitude of modification, substitution and charge is intended in the foregoing disclosure, and in some instances, some features of the present invention may be employed without a corresponding use of other features.

What is claimed is:

1. A container for the repetitive dispensing of substantially equal predetermined quantities of liquid comprising a first container having a bottom portion, sidewall portion and an open-ended neck portion, a second container disposed at least substantially within the first container and depending from the neck portion thereof comprising an elongated tubular member open ended at the upper extremity and closed at its bottom, a third container disposed completely within said first container, integral with and disposed substantially concentrically around said second container to form an annular reservoir, said third container comprising sidewall, bottom and top portions which together form a fluid sealing enclosure, the top and bottom portions being integral with and supported by the outer surface of said second container, said third container communicating with said first container by means of an opening provided on the upper portion of said sidewall of said third container, said opening serving as a liquid inlet to said third container, and a second tubular member connecting the bottom portions of said second container with the bottom of said third container, and serving as a fluid passageway there between, said second tubular member having a volume substantially smaller than said third container whereby substantially the same quantity of liquid is repetively dispensed, and venting means for permitting air to escape from said third container, said venting means communicating with said first container and said third container through said second container and said second tubular member.

2. A container according to claim 1 wherein said second and third containers are essentially cylindrical in shape.

3. A container according to claim 1 wherein said neck portion is externally threaded.

4. A container according to claim 1 wherein the top portion of said third container is integral with said primary container.

5. A container according to claim 1 wherein the top portion of said third container is separate from said first container.

6. A container according to claim 1 wherein the depth of said third container is from about 15 to 50% of the depth of said second container.

7. A container according to claim 1 wherein the ratio of the effective liquid volume of said third container to the volume of said second container situated below the bottom surface of said third container is not more than about 0.9:1.

8. A container according to claim 1 wherein the diameter of said second tubular member is from about 10 to 25% of the diameter of said second container.

9. A container according to claim 1 wherein the diameter of said third container exceeds the diameter of said second container by at least about 50%.

10. A container according to claim 1, wherein said container comprises a synthetic, polymeric, film-forming material.

* * * * *